United States Patent [19]
Serizawa

[11] 3,980,255
[45]*Sept. 14, 1976

[54] TAPE CASSETTE
[75] Inventor: Akio Serizawa, Tokyo, Japan
[73] Assignee: Sony Corporation, Tokyo, Japan
[ * ] Notice: The portion of the term of this patent subsequent to Aug. 19, 1992, has been disclaimed.
[22] Filed: Mar. 26, 1975
[21] Appl. No.: 562,150

Related U.S. Application Data
[62] Division of Ser. No. 403,431, Oct. 4, 1973, Pat. No. 3,900,170.

[52] U.S. Cl. ................................ 242/198; 242/199
[51] Int. Cl.[2] .................... G03B 1/04; G11B 15/32; G11B 23/04
[58] Field of Search .......................... 242/197–200; 352/72–78 C; 360/92, 93, 132

[56] References Cited
UNITED STATES PATENTS
3,900,170  8/1975  Serizawa ............................ 242/198

Primary Examiner—Leonard D. Christian
Attorney, Agent, or Firm—Lewis H. Eslinger; Alvin Sinderbrand

[57] ABSTRACT

A tape cassette for a magnetic recording and/or reproducing apparatus has a housing formed with an opening through which the tape can be withdrawn from the cassette housing for the recording or reproducing of signals thereon, as by one or more rotary magnetic heads, and a lid is provided to normally close the housing opening when the cassette is not in use and thereby protect the tape from damage thereto. The cassette housing is provided with guides thereon extending at right angles to each other, for example, parallel to the relatively long and short sides of the cassette housing when the latter is rectangular, for the purpose of guiding the cassette into a holder therefor in either of the directions parallel to the long and short sides, respectively, of the housing. A latch mechanism is provided for locking the lid in its closed position, and such latch mechanism is releasable in response to the insertion of the cassette into a holder in either of the foregoing directions.

3 Claims, 12 Drawing Figures

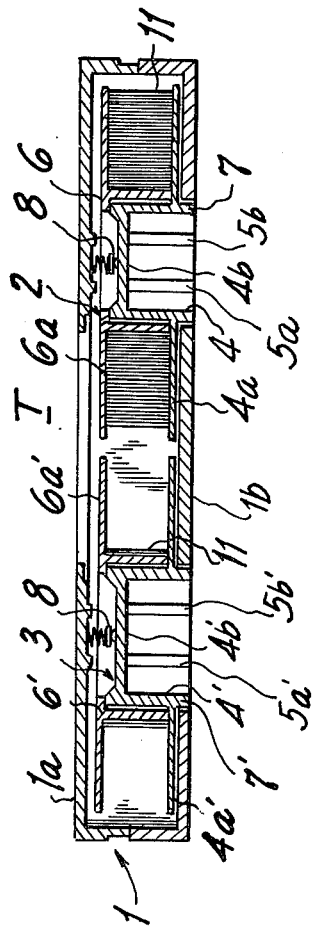
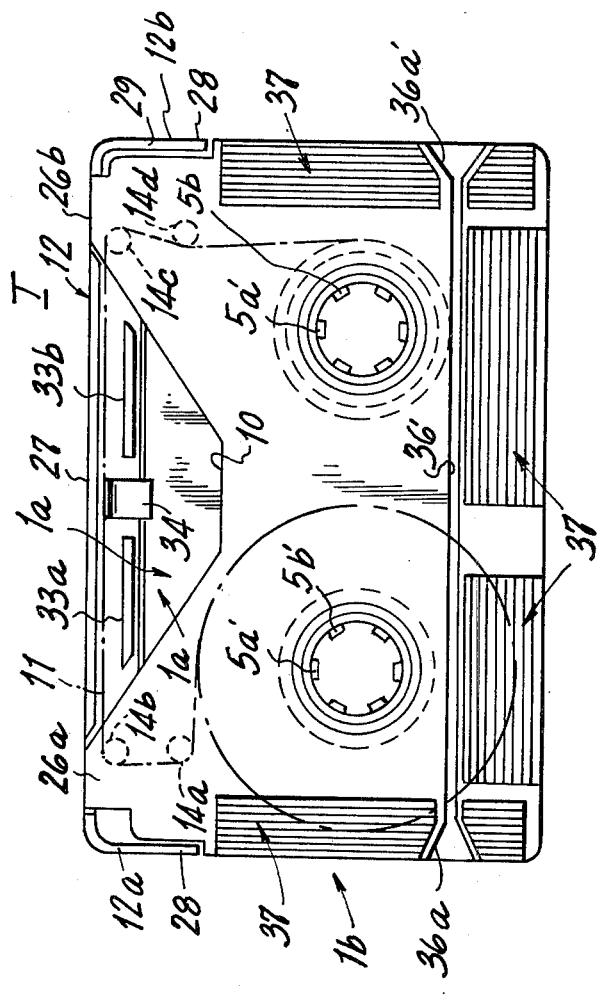

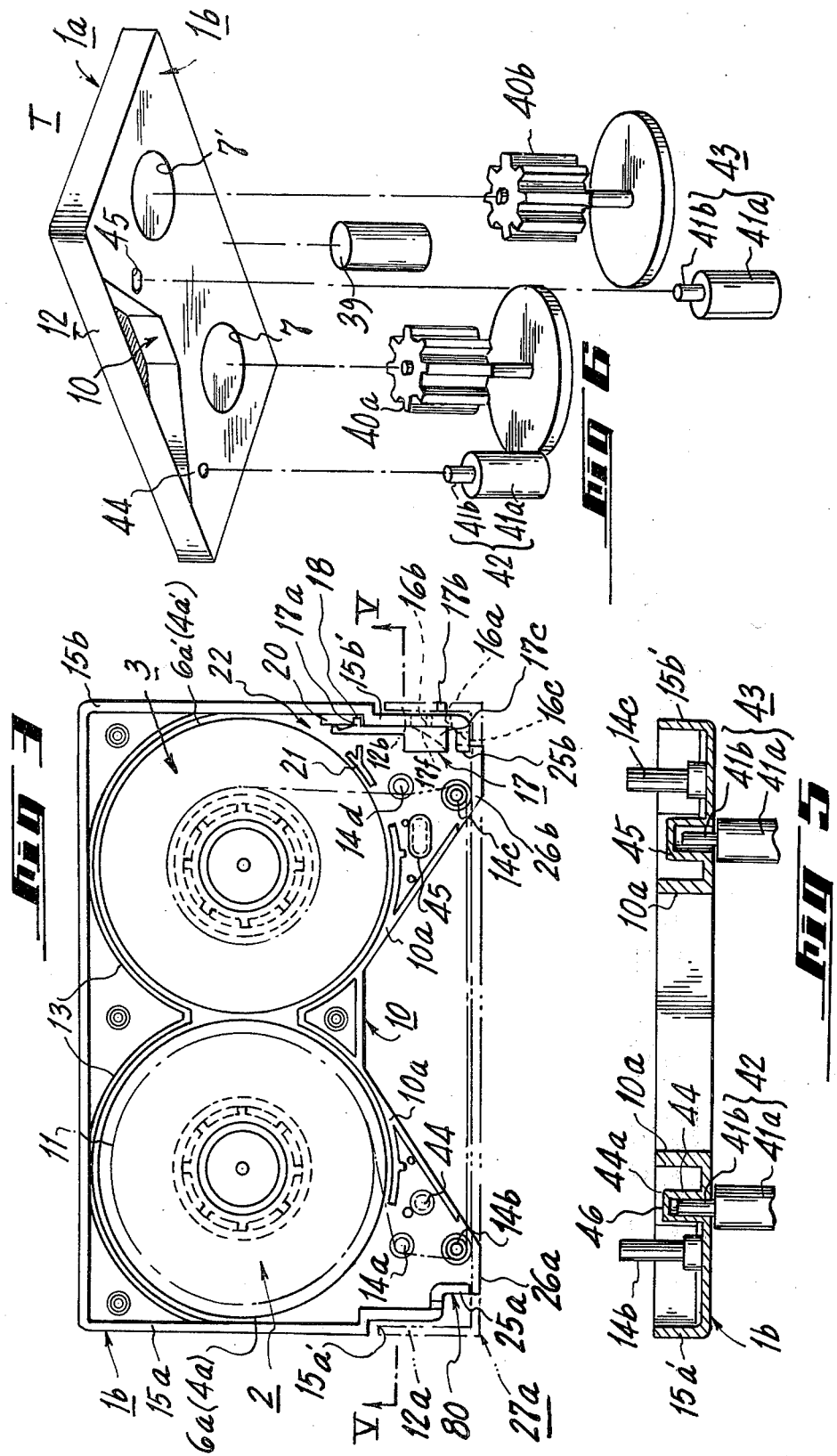

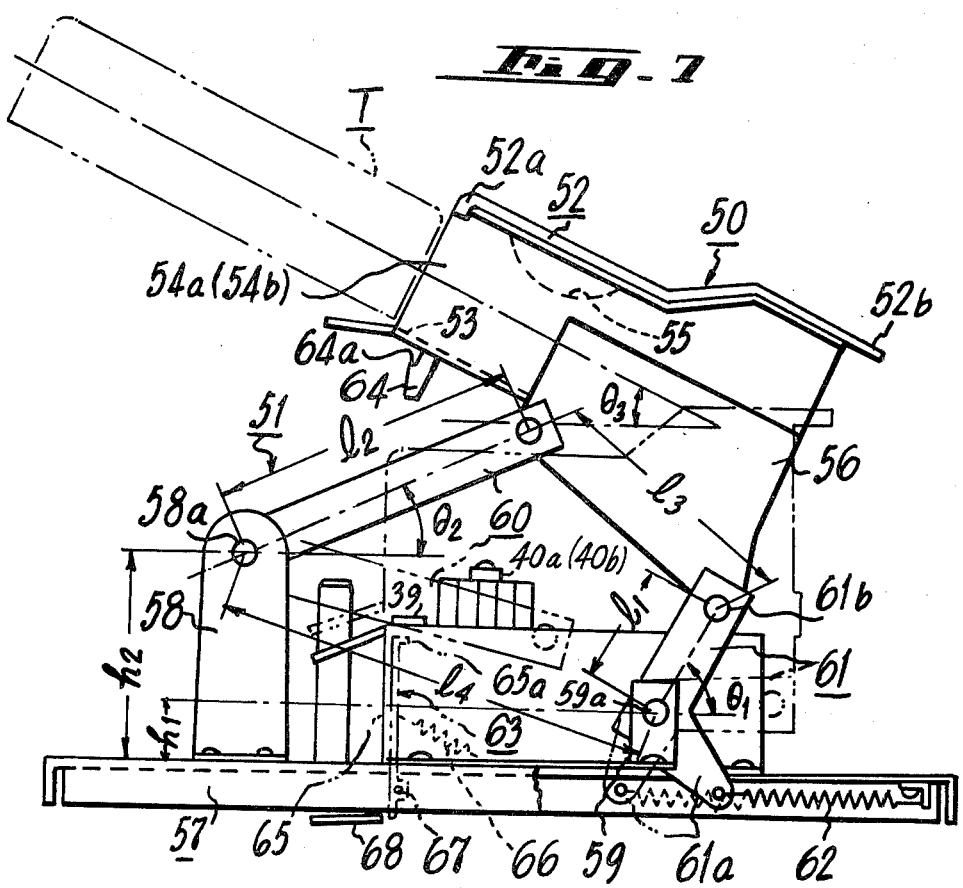
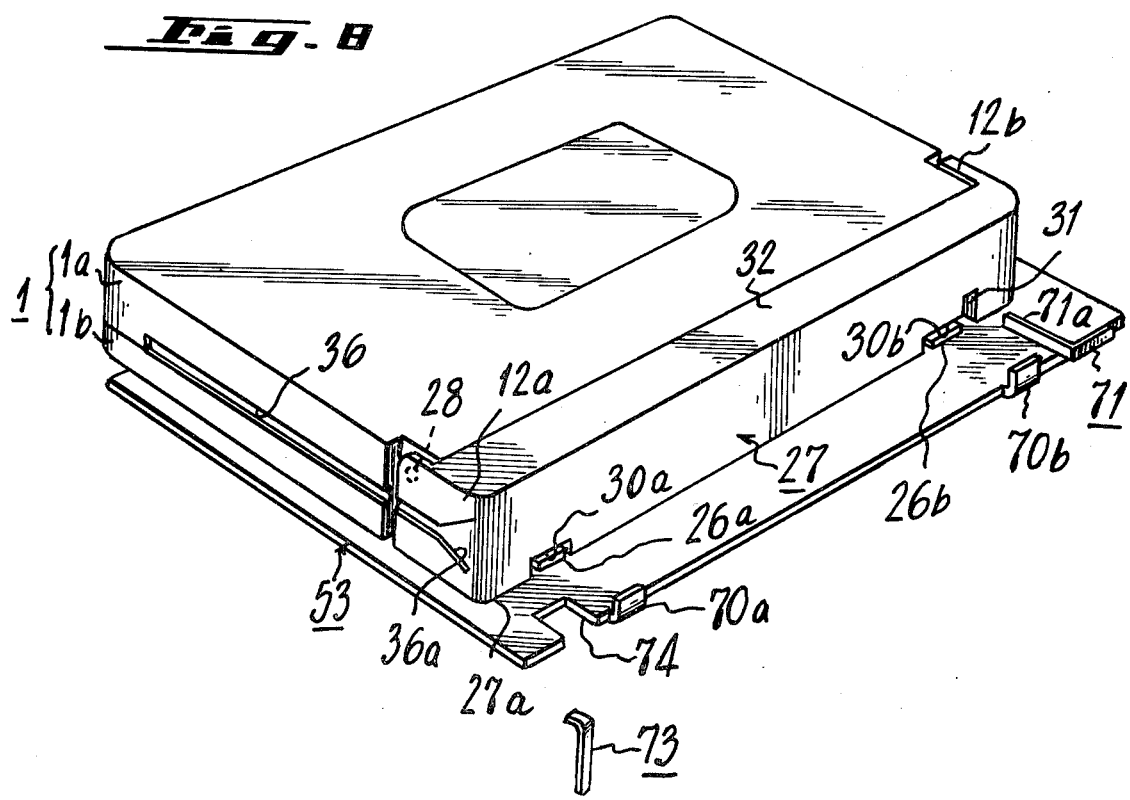

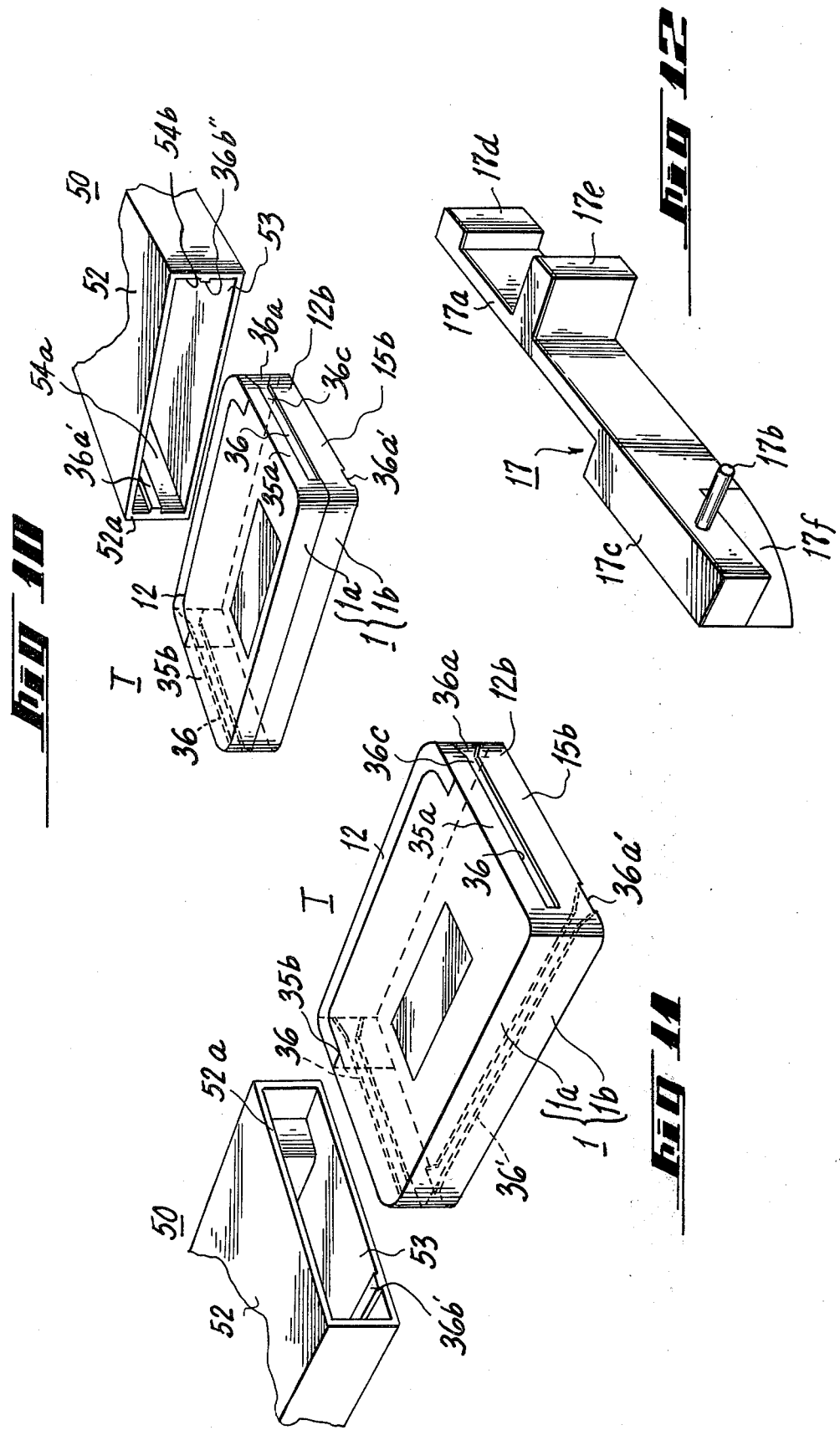

TAPE CASSETTE

CROSS REFERENCE TO RELATED APPLICATIONS

This is a division of application Ser. No. 403,431, filed Oct. 4, 1973 now U.S. Pat. No. 3,900,170.

BACKGROUND OF THE INVENTION

1. Field of the Invention

This invention relates generally to tape cassettes and more particularly is directed to improvements in tape cassettes for protecting the tape contents thereof, when not in use, and for ensuring the proper positioning of the tape cassette in respect to a cassette loading mechanism by which the cassette is positioned on magnetic recording and/or reproducing apparatus.

2. Description of the Prior Art

The use of tape cassettes in magnetic recording and/or reproducing apparatus has been expanding steadily as a result of the protection afforded to the tape and the ease with which the tape can be loaded on the apparatus for a recording or reproducing operation. Initially, tape cassettes were used in connection with magnetic recording and reproducing apparatus of the type having a fixed magnetic head projected into the cassette housing through a relatively small window. However, it has recently been proposed to employ tape cassettes in apparatus of the type having one or more rotary magnetic heads, for example, as in magnetic tape apparatus for recording and reproducing video signals. Particularly in the latter case, it is necessary that the tape cassette be easily and accurately positioned on the apparatus in order to ensure the reliable operation of an associated tape loading device by which the tape is withdrawn from the cassette housing and wrapped about a cylindrical guide drum for scanning in oblique tracks by the rotary magnetic head or heads associated with such drum.

When the recording and reproducing of signals on the tape is effected by a rotary magnetic head or heads, as above, it is necessary to provide the cassette housing with an opening through which the tape can be withdrawn by a tape loading device for engagement with such head or heads. In an existing cassette of the foregoing type, for example, as disclosed in U.S. Pat. No. 3,735,939, issued May 29, 1973, and having a common assignee herewith, the cassette is provided with a lid which is normally spring biased to cover the tape extending across the opening of the cassette housing when the cassette is not in use. U.S. Pat. No. 2,941,741 discloses a similar tape cassette in which an opening extends along the entire length of one side of the cassette housing and a lid is provided for normally covering all of such opening.

Cassette loading mechanisms provided for receiving a tape cassette and moving the latter to an operative position on a magnetic tape recording and/or reproducing apparatus are variously arranged for receiving the tape cassette in the holder by sliding of the cassette either in the direction parallel to the side of the cassette housing having the opening therein or in the direction perpendicular to that side of the housing. However, existing tape cassettes are suitable to be inserted into a holder in only one of the described directions, for example, in the direction perpendicular to the side of the cassette housing having an opening therein, as in U.S. Pat. No. 3,735,939. The aforesaid tape cassettes are also provided with a latching mechanism for locking the lid in its closed position when the cassette is not in use, and such latching mechanism is adapted to be released in response to the sliding movement of the cassette into the respective holder. However, such release of the locking mechanism requires the insertion of the tape cassette in a single direction into the holder. Thus, the existing tape cassettes are not suitable for use in connection with the various available cassette loading mechanisms having holders adapted to receive the cassettes in either of the described directions.

SUMMARY OF THE INVENTION

Accordingly, it is an object of this invention to provide a tape cassette which avoids the above-mentioned disadvantages of tape cassettes of the described type.

More specifically, it is an object of this invention to provide a tape cassette of the described type which is suitable for use in connection with cassette loading mechanisms having holders adapted to receive the cassette either in the direction parallel to the open side of the cassette housing or in the direction at right angles thereto.

A further object is to provide a tape cassette, as aforesaid, in which the latch mechanism for locking the lid in its closed position is releasable in response to the movement of the cassette into a holder in either of the described directions.

In accordance with an aspect of the invention, the cassette housing is provided with guides, for example, in the form of grooves in exterior wall surfaces of the housing, which extend at right angles to each other, that is, in the two directions of possible insertion of the cassette into a holder, and which are asymmetrically located in respect of the respective wall surfaces to receive similarly located ribs in a holder for ensuring the proper orientation of the cassette when inserted in the holder.

In accordance with another feature of this invention, the cassette housing is provided with openings in right-angularly related portions of its peripheral wall adjacent a corner of the cassette housing and communicating or registering with respective cutouts of the lid, in the closed position of the latter, and the latch mechanism for locking the lid in its closed position is releasable by an actuating element extending into the cassette housing through either of such openings and the registered cutout, whereby to permit the release of the latch mechanism in response to movement of the tape cassette into a holder in either of the described directions.

The above, and other objects, features and advantages of this invention, will be apparent in the following detailed description of an illustrative embodiment which is to be read in connection with the accompanying drawings.

BRIEF DESCRIPTION OF THE DRAWINGS

FIG. 2 is a sectional view taken along the line II — II on FIG. 1;

FIG. 3 is a top plan view of the tape cassette according to this invention, but with the top wall of the cassette housing being removed;

FIG. 4 is a bottom plan view of the tape cassette;

FIG. 5 is a sectional view taken along the line V — V on FIG. 3;

FIG. 6 is an exploded perspective view illustrating the manner in which the tape cassette according to this invention is engageable with driving and locating elements of a typical magnetic tape recording and/or reproducing apparatus;

FIG. 7 is a side elevational view of a cassette loading mechanism adapted to receive a tape cassette according to this invention and being effective to dispose such tape cassette in an operative position on the recording and/or reproducing apparatus;

FIG. 8 is a perspective view illustrating the condition of the tape cassette according to this invention in the course of its insertion into a holder included in the cassette loading mechanism of FIG. 7;

FIGS. 10 and 11 are schematic perspective views illustrating the manner in which the tape cassette according to this invention may be inserted into a holder in two different right-angularly related directions; and FIG. 12 is an enlarged perspective view of a latching element included in tape cassettes according to this invention.

DESCRIPTION OF THE PREFERRED EMBODIMENT

Figure 1:
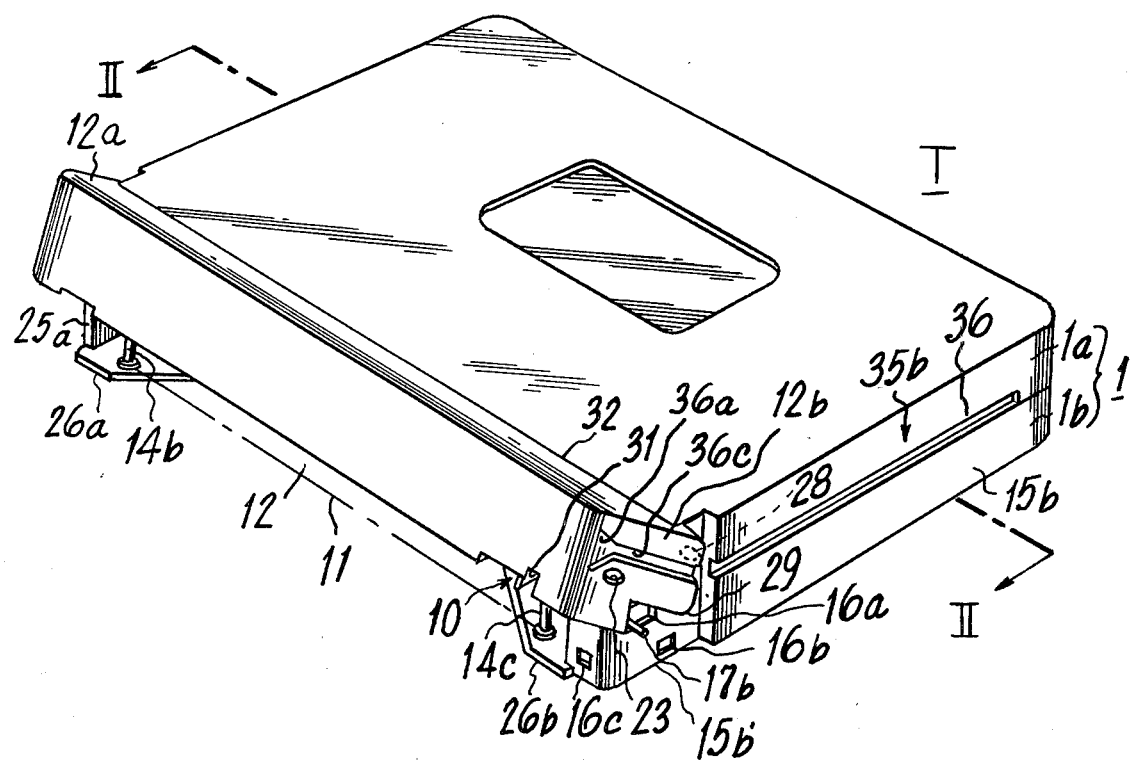
FIG. 1 is a perspective view of a tape cassette in accordance with an embodiment of this invention, and which is shown with its lid partially opened.

Referring to the drawings in detail, and initially to FIGS. 1 – 3 thereof, it will be seen that a tape cassette T to which this invention may be applied generally comprises a substantially rectangular cassette housing 1 formed of mating molded plastic upper and lower sections 1a and 1b which are suitably secured together and which are respectively constituted by top and bottom walls having side or peripheral wall-defining flanges extending along one of the relatively long sides and both relatively short sides of the rectangular housing 1. Thus, the other relatively long side of cassette housing 1 is open or without a side wall and cooperates with a contiguous trapezoidal cutout in the bottom wall to define a recess or opening 10 through which tape 11 contained within the cassette housing can be extracted or withdrawn from the cassette housing. The tape cassette T further comprises a lid 12 which is pivoted on cassette housing 1 and which is adapted, in a closed position, to close or cover the open relatively long side of cassette housing 1.

As shown particularly on FIGS. 2 and 3, the supply of tape 11 contained in cassette housing 1 is wound on supply and take-up reels 2 and 3. The supply reel 2 is shown to include a cylindrical hub 4 which, at its lower end, is loosely and rotatably guided in a circular hole 7 provided in the bottom wall of cassette housing 1. A lower flange 4a extends radially outward from hub 4 above the bottom wall of cassette housing 1 and the upper end of cylindrical hub 4 has an end wall 4b extending thereacross. The inner surface of hub 4 is formed with axial projections or splines 5a, 5b spaced apart around the hub, for example, with an angular spacing of 60° between adjacent splines, for rotatable coupling of supply reel 2 with a respective reel drive shaft or spindle, as hereinafter described. The supply reel 2 is completed by an outer cylindrical hub 6 which extends downwardly over hub 4 and may be secured to the latter by a suitable adhesive or binder therebetween, and an upper flange 6a extending radially outward from hub 6 to define an annular space between flanges 4a and 6a in which tape 11 may be wound about the secured-together hubs 4 and 6. A spring 8 is interposed between the top wall of housing 1 and end wall 4b of hub 4 for urging supply reel 2 downwardly against the bottom wall of cassette housing 1. A layer (not shown) of a frictional material is preferably coated on the bottom wall of housing 1 under flange 4a to resist rotation of supply reel 2 when the latter is urged downwardly thereagainst by spring 8, whereby to avoid inadvertent loosening of the tape within housing 1 when the cassette T is not in use. As shown, the take-up reel 3 may be identical in construction to the supply reel 2 and its several parts are identified by the same reference numerals but with primes appended thereto.

As shown particularly on FIG. 3, a flange may extend upwardly from the bottom wall of housing 1 along the margin of the cutout in such bottom wall and cooperate with a mating flange depending from the top wall of the cassette housing to define a wall or partition 10a which prevent access to the reels 2 and 3 through the opening or recess 10. Arcuate partitions 13 are similarly provided within housing 1 adjacent the peripheries of the flanges of reels 2 and 3 for preventing the removal from the reels of the turns of tape 11 wound thereon in the event that such turns become loosened. Guide pins 14a and 14b and guide pins 14c and 14d extend upwardly from the bottom wall of cassette housing 1 at opposite sides of the cutout in such bottom wall for guiding the tape 11 between reels 2 and 3 in a path having a run that extends along the open, relatively long side of housing 1.

The side or peripheral walls 15a and 15b of housing 1 which extend along the opposite relatively short sides of the rectangular cassette housing are shown to be formed with inwardly offset end portions 15a' and 15b' adjacent the open relatively long side of the cassette housing (FIG. 3). The lid 12 is shown to include a front portion 27 (FIG. 9) depending from an edge of an elongated top portion 32 (FIG. 1) and ears 12a and 12b directed rearwardly from the opposite ends of front portion 27 to fit into the recesses defined outside of end portions 15a' and 15b' of side walls 15a and 15b and thus lie flush with the outer surfaces of such side walls, as shown particularly on FIG. 8. The offset end portion 15b' of side wall 15b has two spaced apart apertures 16a and 16b extending therethrough, and a latching element 17 (FIGS. 3 and 12), for example, of a resilient plastic, is disposed at the inside of end wall portion 15b'. The latching element 17 is shown to include a relatively thin mounting portion 17a of generally F-shaped configuration, as viewed from above, and a latching pin or projection 17b which extends outwardly through aperture 16a from a relatively thick end portion 17c of the latching element (FIG. 3). A groove 18 is defined between the step formed by inwardly offset end portion 15b' and an adjacent inward projection 20, and a gap 22 is defined between such projection 20 and an adjacent abutment 21 extending upwardly from the bottom wall of housing 1. The F-shaped mounting portion 17a of latching element 17 is received in the gap 22, and abutment 21 urges the end flange 17d of F-shaped mounting portion 17a against projection 20 while the other flange 17e of such mounting portion is urged into recess 18. Thus, the relatively thick end portion 17c of latching element 17 is normally resiliently held against end portion 15b' of side wall 15b to extend the latching pin or projection 17b through aperture 16a beyond the outer surface of end portion 15b'. However, as hereinafter described, a latch releasing element can be extended inwardly through aperture 16b to act against end portion 17c of the latching element for urging the same away from the adjacent wall end portion 15b', and thereby retract the locking projection 17b into aperture 16a. Wall end portion 15b' has an inwardly directed end 25b (FIG. 3) which extends in front of the thick end portion 17c of the latching element and which is formed with an aperture 16c (FIGS. 1 and 3) that is aligned with an oblique or beveled end surface 17f provided at the bottom part of thick end portion 17c. Thus, a latch releasing element can be extended through aperture 16c to act against oblique or beveled end surface 17f as an alternative means for displacing the thick end portion 17c of the latching element away from the adjacent wall end portion 15b', as hereinafter described in detail.

Figure 9:
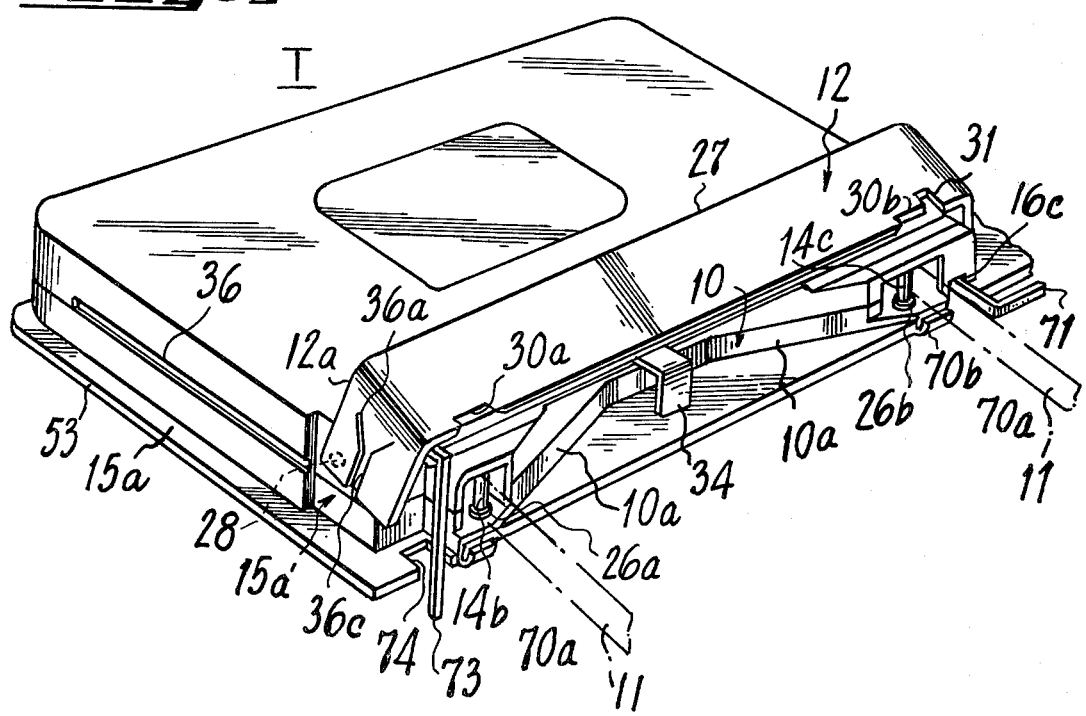
FIG. 9 is a perspective view similar to that of FIG. 8, but showing the tape cassette in the condition thereof when located in its operative position by means of the associated holder.

The ears 12a and 12b at the opposite ends of lid 12 are formed with inwardly directed pins 28 (FIGS. 1, 8 and 9) engageable in respective apertures or recesses (not shown) in wall end portions 15a' and 15b' so as to mount lid 12 pivotally on cassette housing 1 for movement between a closed position (FIG. 8) and an opened position (FIG. 9). The ear 12b of lid 12 which is adjacent wall end portion 15b' is formed with an aperture 23 which, in the closed position of the lid, is adapted to receive the latching pin or projection 17b for locking the lid in its closed position. However, when the thick end portion 17c of latching element 17 is displaced away from the adjacent wall end portion 15b', as described above, latching pin or projection 17b is withdrawn from aperture 23 and thereby releases the lid for movement to its opened position, as hereinafter described, against the force of a suitable spring (not shown) which normally urges the lid to its closed position. The wall end portion 15a' is shown to have an inwardly directed, right-angled end 25a for defining a recess 80 in the respective corner of cassette housing 1 (FIG. 3) for a purpose hereinafter described in detail. As shown on FIG. 1, a tab or claw 19 may be formed on side wall 15b, with the presence or absence of such tab 19 being detected by a conventional device of the magnetic recording and/or reproducing apparatus when the cassette is in an operative position on such apparatus to prevent inadvertent erasing of signals recorded on tape 11.

The side edge of the bottom wall of cassette housing 1 at opposite ends of the cutout portion of such bottom wall may define locating elements 26a and 26b which project beyond ends 25a and 25b of wall portions 15a' and 15b' (FIG. 3) so that, in the closed position of lid 12 (FIGS. 4 and 8), such locating elements 26a and 26b extend through respective notches or cutouts 30a and 30b formed in the lower edge of front portion 27 of the lid and are substantially flush with the outer surface of front portion 27. The cutouts 30a and 30b are shown to be substantially filled by locating elements 26a and 26b in the closed position of the lid. The lid 12 is further formed with recesses or cutouts 29 and 31 (FIG. 1) in the ear 12b and in the front portion 27 so that, in the closed position of lid 12, cutouts 29 and 31 will be substantially aligned with the previously mentioned apertures 16b and 16c, respectively, for permitting access to such apertures for the purpose described above.

It will be apparent that, when lid 12 is in its closed position, the run of tape 11 extending along opening 10 between guide pins 14b and 14c is shielded or protected, at the outside, by front portion 27 of the lid and, from above, by top portion 32 of the lid. The lid 12 of tape cassette T may further have partitions 33a and 33b (FIG. 4) depending from top portion 32, which partitions extend parallel to, and are spaced from, front portion 27 of the lid so as to define a channel therebetween in which the run of the tape between guide pins 14b and 14c is accommodated when lid 12 is in its closed position. The partitions 33a and 33b have a depth at least equal to the width of tape 11 so that, with the lid in its closed position, partitions 33a and 33b substantially prevent contact with the tape run through the cutout portion of the bottom wall of cassette housing 1. Further, a substantially L-shaped tape locating member 34 may extend outwardly and downwardly from the top wall of cassette housing 1 (FIG. 9) so as to be located in the gap between partitions 33a and 33b in the closed position of lid 12 (FIG. 4). The tape locating member 34 ensures that, even if the tape between reels 2 and 3 becomes substantially loosened, the run of the tape extending between guide pins 14b and 14c will be properly positioned in respect to a tape engaging pin or member of a tape loading device by which the tape is to be withdrawn from the cassette housing.

In order to guide the cassette T in accordance with this invention during its insertion into the holder of a cassette loading mechanism, as hereinafter described, the cassette T is provided with guiding means extending at right angles to each other, that is, perpendicular to the open relatively long side of cassette housing 1 and parallel to such long side, respectively. In the illustrated embodiment of the invention, such guiding means are constituted by grooves 36 (FIGS. 1, 9, 10 and 11) formed in the outer surfaces 35a and 35b of the relatively short side walls 15a and 15b and aligned with groove extensions 36c in the adjacent ears 12a and 12b of lid 12 when the latter is in its closed position. The groove extensions 36c have diverging open ends 36a by which respective guiding ridges 36a'' and 36b'' of a cassette holder 50 are led into grooves 36 when cassette T is inserted into such holder 50 in the direction perpendicular to the open relatively long side of the cassette housing (FIG. 10). Further, in accordance with this invention, the undersurface of the bottom wall of cassette housing 1 is formed with a guiding groove 36' (FIG. 4) extending parallel to the long open side of the cassette housing, and having enlarged or diverging open ends 36a' so that, when tape cassette T is inserted into a holder 50 in the direction parallel to the relatively long open side of the cassette housing, as in FIG. 11, one or the other of the diverging or enlarged ends 36a' of groove 36' will initiate or facilitate the entry of a guiding ridge 36b' of holder 50 into groove 36'. Thus, it will be seen that tape cassette T according to this invention can be used in various types of magnetic tape recording and/or reproducing apparatus having holders which are adapted to receive the tape cassette in different directions. The grooves 36 and 36' are preferably asymmetrically located relative to the surfaces of the cassette housing in which they are formed. Thus, the grooves 36 in side wall surfaces 35a and 35b are located closer to the top than to the bottom of the cassette housing, while the groove 36' in the bottom wall surface of the cassette housing is located closer to one relatively long side of the cassette housing than to the other relatively long side thereof. By reason of such asymmetrical positioning of grooves 36 and 36' and of the respective guiding ridges in the holders 50, the cassette T is insertable in each holder 50 in only a single proper orientation relative to the latter.

As shown on FIG. 4, the bottom surface of cassette housing 1 may be formed with longitudinally grooved surface portions 37 extending along the opposite relatively short sides of the cassette housing and along the closed relatively long side of the housing so that the cassette housing can be conveniently gripped at the resulting roughened surface portions when inserting the tape cassette into a holder in either of the directions illustrated on FIGS. 10 and 11.

In order to accurately locate the tape cassette T in its operative position on a magnetic tape recording and/or reproducing apparatus, the latter is provided with a pair of locating pins 42 and 43 (FIGS. 5 and 6) projecting upwardly from a suitable baseplate or chassis 57 (FIG. 7) and each having a relatively large diameter base portion 41a and a relatively small diameter end portion 41b extending upwardly from the base portion 41a to define a shoulder at the top of the latter. An additional locating pin 39 (FIG. 6) extends upwardly from the baseplate or chassis 57 and has its upper end surface at the same level as the shoulders provided at the top of base portions 41a of locating pins 42 and 43. The locating pins 42 and 43 are disposed so that, when tape cassette T is in its proper operative position, the small diameter end portions 41b of locating pins 42 and 43 are respectively engaged in sockets 44 and 45, respectively, which are formed in the lower section 1b of housing 1 and open downwardly at the bottom wall surface of the latter. The socket 44 is diametrically dimensioned to closely receive end portion 41b of locating pin 42, while the other socket 45 is laterally elongated, that is, elongated in the direction parallel to a line connecting the edge surfaces of locating elements 26a and 26b. Thus, even if there is some variation in the distance between the centers of locating pins 42 and 43, no difficulty will be experienced in obtaining the engagement of the end portions 41b of pins 42 and 43 with the respective sockets 44 and 45 when the tape cassette is properly located by means of its locating elements 26a and 26b, as hereinafter described. It will be noted that the sockets 44 and 45 are disposed adjacent the open relatively long side of the cassette housing 1, and the locating pin 39 is positioned relative to locating pins 42 and 43 so that, when sockets 44 and 45 receive end portions 41b of locating pins 42 and 43, the bottom surface of cassette housing 1 will rest on the shoulders at the top of base portions 41a of pins 42 and 43 adjacent the opposite sides of the cutout in the bottom wall of the cassette housing and on the upper end of locating pin 39 at a single point adjacent the closed relatively long side of the cassette housing. The reel drive shafts or spindles 40a and 40b (FIG. 6) of the recording and/or reproducing apparatus are of course located relative to the locating pins 39, 42 and 43 so that, when the tape cassette T is positioned by such locating pins, the drive shafts 40a and 40b will extend into the hubs of reels 2 and 3 and be rotatably coupled with the latter.

Since the end portion 41b of locating pin 42 is intended to engage closely in the respective socket 44, the top wall 44a of such socket may be formed with a vent hole 46 (FIG. 5) through which air may enter and leave the socket to avoid any interference with the easy insertion and removal of the end portion 41b of pin 42.

Referring now to FIG. 7, it will be seen that the tape cassette T in accordance with this invention may be conveniently used in connection with a magnetic tape recording and/or reproducing apparatus having a cassette loading mechanism including a holder 50 which receives the cassette in a conveniently inclined elevated position shown in full lines and is then movable downwardly to the position shown in broken lines at which the received cassette is horizontally disposed in its operative position on the previously described locating pins 39, 42 and 43 for rotatable coupling of its reels 2 and 3 with drive shafts 40a and 40b and further for proper positioning of the tape within the cassette housing in respect to the tape loading device (not shown) by which the tape may be extracted or withdrawn from the cassette housing for a recording or reproducing operation. The holder 50 is shown to be generally of box-like configuration and includes top and bottom walls 52 and 53 which are connected at their adjacent ends by opposed end walls 54a and 54b so as to be open at the other opposed sides of holder 50. The holder 50 of the cassette loading mechanism shown on FIG. 7 is intended to have the tape cassette T inserted therein in the direction perpendiculr to the open relatively long side of the cassette housing, for example, as on FIG. 10, and thus the distance between walls 54a and 54b is selected to be slightly larger than the larger dimension of the cassette housing and such end walls 54a and 54b are provided with the guide ridges 36'' and 36b'' for entry into the widened ends 36a of grooves 36 when the tape cassette is inserted with lid 12 at the leading side thereof. As shown on FIG. 7, the top wall 52 of holder 50 is at a relatively small distance from bottom wall 53 at the open side of the holder which tape cassette T is inserted, while the top wall 52 is stepped upwardly, as at 52b, adjacent the opposite side of holder 50 so that the top wall will not there interfere with the opening of lid 12 within the cassette holder. It will further be understood that bottom wall 53 of the cassette holder has openings (not shown) formed therein and being located to permit the upward passage therethrough, when holder 50 is in the operative position, of the reel drive shafts 40a and 40b and of the cassette locating pins 39, 42 and 43. Leaf springs 55 are provided at the underside of top wall 52 to bear downwardly on the top wall of the cassette housing and thereby hold the latter downwardly against bottom wall 53 when tape cassette T is inserted in holder 50.

The illustrated cassette loading mechanism is further shown to comprise a shifting mechanism 51 by which holder 50 may be moved between the positions shown in full and broken lines on FIG. 7. Such shifting mechanism 51 includes a cradle 56 to which holder 50 is secured, brackets 58 and 59 fixed to baseplate or chassis 57 and supporting respective shafts 58a and 59a which extend parallel to the plane of baseplate 57 and are spaced from each other by a distance $l_4$. Shaft 59a is disposed at a relatively small distance $h_1$ above baseplate 57, while shaft 58a is disposed at a relatively large distance $h_2$ above the baseplate. A pair of levers 60 of a relatively long length $l_2$ are pivotally supported, at one end, on shaft 58a, and the other ends of lever 60 are pivotally connected to cradle 56. A pair of levers 61 of a relatively short length $l_1$ are pivotally mounted, at one end, on the shaft 59a and have their other ends pivotally connected to cradle 56 at a distance $l_3$ from the pivotal connections of levers 60 to the cradle. At least one of the levers 61 has an arm 61a extending therefrom and connected to tension spring 62 by which the respective lever 61 is urged in a counterclockwise direction to the position illustrated in full lines.

Preferably, the various elements of shifting mechanism 51 are dimensioned as follows:

$l_1$ is approximately equal to 2/5 $l_2$ $l_3$ is approximately equal to 3/5 $l_4$ $h_1$ is approximately equal to 2/7 $h_2$ $\theta_1$ (that is, the angle between the center line of each lever 61 in its raised position and the horizontal) is approximately equal to 60°

$\theta_2$ (that is, the angle between the center line of each lever 60 in its raised position and the horizontal) is approximately equal to 25°.

When the above dimensional relationships are provided, cassette holder 50 is inclined from the horizontal at a convenient angle $\theta_3$ for receiving the tape cassette T when in its raised position, and, when holder 50 is moved downwardly to its operative position illustrated in broken lines, the final downward movement of the holder is effected in a vertical direction for permitting the proper engagement of reel drive shafts 40a and 40b and of locating pins 39, 42 and 43 with the respective parts of the tape cassette.

In order to lock holder 50 in its lowered operative position against the force of spring 62, the cassette loading mechanism is further shown to include a locking mechanism 63 that includes a locking pawl 64 depending from bottom wall 53 of holder 50, and a retainer 65 which is pivoted at 67 on baseplate 57 and has a locking portion 65a at its upper end engageable with a nose 64a on pawl 64 when holder 50 is in its lowered operative position. A spring 67 acts on retainer 65 to pivot the latter in the clockwise direction into engagement with pawl 64, and the lower end portion of retainer 65 is engageable by an operating rod 68 for rocking of retainer 65 in the counterclockwise direction, that is, in the direction for releasing the pawl 64. The rod 68 may be actuable by an ejection button (not shown) when it is desired to release pawl 64 and thereby permit spring 62 to return holder 50 to its elevated inclined position at which the tape cassette T is conveniently removed therefrom.

As shown particularly on FIG. 8, bottom wall 53 of holder 50 may be provided with a pair of abutments 70a and 70b directed upwardly from the edge of bottom wall 53 remote from the open side of holder 50 at which tape cassette T is introduced. The abutments 70a and 70b are spaced apart at locations along the respective edge of bottom wall 53 that correspond to the locations of locating elements 26a and 26b on the bottom wall of cassette housing 1, and abutments 70a and 70b project above the top surface of bottom wall 53 by a distance substantially equal to the thickness of locating elements 26a and 26b. When tape cassette T is inserted into holder 50, the movement of the tape cassette in the direction of its insertion is limited by the engagement of locating elements 26a and 26b with the respective abutments 70a and 70b. Thus, the final position of cassette housing 1 relative to holder 50 is precisely determined without the possibility of error resulting from any clearance or looseness of lid 12 relative to the cassette housing. By reason of such precise determination of the position of cassette housing 1 in respect to holder 50, proper engagement of the tape cassette with reel drive shafts 40a and 40b and with locating pins 39, 42 and 43 is ensured when holder 50 is lowered to its operative position. Since abutments 70a and 70b on holder 50 are engaged only with locating elements 26a and 26b projecting through cutouts 30a and 30b in lid 12, such engagement for determining the final position of cassette housing 1 in holder 50 does not interfere with the opening of lid 12, as on FIG. 9.

An L-shaped latch releasing member 71 (FIGS. 8 and 9) which is suitably attached to the side wall 54a (not shown on FIGS. 8 and 9) of holder 50 or to the adjacent side of carriage 56 has an end portion 71a extending in the direction opposed to the direction of insertion of tape cassette T in the cassette holder and is located to extend into notch or cutout 31 of lid 12 and aperture 16c of cassette housing 1 as the tape cassette nears its final position in holder 50. Thus, during the final portion of the inserting movement of the tape cassette to its predetermined position in holder 50, end portion 71a of latch releasing member 71 acts against the oblique or beveled end surface 17f of the thick end portion 17c of latching element 17 for displacing such thick end portion 17c laterally away from the adjacent wall end portion 15b', and thereby releasing the latching pin or projection 17b from the opening 23 of lid 12 so that the latter is then free to be opened.

Of course, if the tape cassette T is used with a cassette loading mechanism of the type in which the cassette is inserted in the lengthwise direction into the holder 50, for example, as illustrated on FIG. 11, a latch releasing member similar to the member 71 on FIGS. 8 and 9 is provided at the side of the holder toward which the tape cassette is moved so that, as the tape cassette nears its final position in the cassette holder, such latch releasing member extends through cutout 29 of lid 12 and aperture 16b of cassette housing 1 to act against the adjacent side of thick end portion 17c of latching element 17 for similarly releasing the latching element and freeing the lid 12 for movement to its opened position.

In either case, that is, whether the tape cassette is inserted into a cassette holder in the lengthwise direction of the cassette or at right angles thereto, the opening of lid 12 may be effected in response to the downward movement of cassette holder 50 from its raised cassette receiving position to its lowered operative position. In order to effect such opening of lid 12, the magnetic tape recording and/or reproducing apparatus may be provided with a lid opening member 73 (FIGS. 8 and 9) which extends upwardly, for example, from the baseplate 57 on FIG. 7, and is fixedly positioned so that, as holder 50 is moved downwardly to its operative position, the bent upper end of member 73 will engage, and push upwardly against, the lower edge of front portion 27 of lid 12 adjacent the end of such front portion 27 from which ear 12a extends. As shown particularly on FIG. 9, bottom wall 53 of holder 50 is formed with a cutout 74 adjacent abutment 26a so as to substantially register with the corner recess 80 of cassette housing 1. Such cutout 74 and corner recess 80 are provided to receive lid opening member 73 as the holder 50 and tape cassette T move forwardly in the course of the downward movement of holder 50 from its raised inclined position to its lowered operative position parallel to baseplate 57. By reason of the engagement of member 73 with the lower edge of front portion 27 of lid 12, the latter is pivoted to its open position during the final movement of holder 50 to its lowered operative position.

It will be apparent from the foregoing that, when holder 50 reaches its lowered operative position, the cassette housing accurately located in the cassette holder is, accordingly, accurately positioned for engagement by the locating pins 39, 42 and 43 and the lid 12 of the tape cassette is fully opened so that the tape 11 can be withdrawn or extracted from the cassette housing, as by a conventional tape loading device (not shown). When cassette housing 1 is positioned by locating pins 39, 42 and 43, reel drive shafts 40a and 40b engaging within the hubs of reels 2 and 3 preferably act against the end walls 4b and 4b' of such reels so as to raise the latter away from the frictional material on the bottom wall of cassette housing 1 against the force of springs 8 and 8', whereby to make the tape supply and take-up reels freely rotatable.

It will be further apparent that, in the tape cassette T according to this invention, guiding means, for example, the previously described grooves 36 and groove 36', are effective to guide the cassette into a holder either in the direction perpendicular to, or the direction parallel to, the longitudinal axis of the cassette, and that the latching element 17 for locking lid 12 in its closed position is arranged for release during the insertion of the tape cassette into a holder in either of the described directions.

It is to be noted that the grooves 36 and 36' on cassette housing 1 according to this invention may be replaced by similarly positioned elongated ridges, in which case, the ridges 36a'' and 36b'' (FIG. 10) and the ridge 36b' (FIG. 11) provided in the cassette holder 50 are replaced by similarly positioned grooves.

Although an illustrative embodiment of this invention has been described in detail herein with reference to the accompanying drawings, it is to be noted that the invention is not limited to that precise embodiment, and that various changes and modifications may be effected therein by one skilled in the art without departing from the scope or spirit of the invention as defined in the appended claims.

What is claimed is:

1. A tape cassette comprising a housing of generally rectangular configuration containing a supply of tape and having top and bottom walls and a peripheral wall extending between said top and bottom walls along three of the sides of the latter so as to leave an opening along the fourth side of the housing through which the tape can be withdrawn, said tape cassette being insertable into a cassette holder in a selected one of at least two directions parallel to said fourth side and at right angles to the latter, respectively, a lid including an elongated front portion substantially coextensive in length with said fourth side of the housing and ears directed rearwardly from said front portion at the opposite ends of the latter, said ears being pivoted on said peripheral wall of the housing at the sides of the latter which extend at right angles to said fourth side for movement of said lid between a closed position covering said opening and an opened position exposing said opening, and latching means disposed in said housing adjacent said peripheral wall near a corner of the housing between said fourth side and a contiguous side of said housing; and in which said latching means is yieldably urged toward said peripheral wall to engage the adjacent one of said ears of the lid and lock the latter in said closed position thereof, and said housing has apertures therein adjacent said corner and respectively opening in said directions parallel to said fourth side and at right angles to the latter and through which said latching means can be selectively released from said lid to permit movement of the latter to said opened position upon insertion of the tape cassette into a cassette holder in the respective one of said directions.

2. A tape cassette according to claim 1; in which said ears of the lid are pivoted at an axis spaced from said front portion of the lid, and said latching means is engageable with said adjacent one of the ears at a location intermediate said axis and said front portion.

3. A tape cassette according to claim 1; in which said peripheral wall of the housing has recessed portions at said sides of the housing which extend at right angles to said fourth side, and said ears of the lid are received in said recessed portions of the peripheral wall so as to be flush with the latter at said sides at right angles to said fourth side.

* * * * *